United States Patent
Perry et al.

(10) Patent No.: US 6,514,334 B1
(45) Date of Patent: Feb. 4, 2003

(54) CEMENTITIOUS MIXTURE

(75) Inventors: Paul Perry, Pencoed (GB); Colin Klander William Perry, Blackmill (GB); Maria Coral Miers, Pencoed (GB); Shereen Parrish, Blackmill (GB); Patricia Phillis Perry, Blackmill (GB); Gary Hunt, Cardiff (GB)

(73) Assignee: Broughshire Limited, Mid Glamorgan (GB)

( * ) Notice: Subject to any disclaimer, the term of this patent is extended or adjusted under 35 U.S.C. 154(b) by 0 days.

(21) Appl. No.: 09/673,251

(22) PCT Filed: Apr. 26, 1999

(86) PCT No.: PCT/GB99/01272

§ 371 (c)(1),
(2), (4) Date: Mar. 7, 2001

(87) PCT Pub. No.: WO99/55636

PCT Pub. Date: Nov. 4, 1999

(Under 37 CFR 1.47)

(30) Foreign Application Priority Data

Apr. 24, 1998 (GB) .......................... 98 088 69

(51) Int. Cl.$^7$ ................................. C04B 7/24
(52) U.S. Cl. ........................ 106/713; 106/745
(58) Field of Search .................. 106/713, 745

(56) References Cited

U.S. PATENT DOCUMENTS

| 4,900,360 A | 2/1990 | Whitescarver et al. ........ 106/97 |
| 5,551,976 A | 9/1996 | Allen .......................... 106/696 |

FOREIGN PATENT DOCUMENTS

| DE | 37 34 879 A | 3/1989 |
| DE | 41 04 919 A | 8/1992 |
| DE | 44 20 507 A | 12/1995 |

OTHER PUBLICATIONS

Derwent Abstract, 82–55610E & J 57001482A, "Solidifying cyan–contg. effluent–by adding calcium and silicon cpds., and treating with steam in autoclave", (EBAI) Ebara Infilco KK.
Patent Abstracts of Japan, Apr. 30, 1998 & JP 10 017355 A, Denka Grace KK, Jan. 20, 1998.
"Ullmann's Encyclopedia of Industrial Chemistry", 1986, VCH Verlagsgesellscahft, Weinheim, XP002109799.
Chemical Abstracts, Jun. 25, 1979, Abstract No. 208985r, Nishimura, Yukio et al., "Calcium silicate hydrate from waste mold sand", XP000189101 & Gov. Ind. Res. Inst. Nagoya, 1978.

*Primary Examiner*—Paul Marcantoni
(74) *Attorney, Agent, or Firm*—Bacon & Thomas

(57) ABSTRACT

A process for making a hydraulic cementitious mixture, which process comprises the steps of: (i) providing a first granular composition (A) comprising expressed in terms of weight percent on an oxide basis: $SiO_2$ 55 to 80, $Al_2O_3$ 10 to 20, $Na_2O$ 1 to 10, $K_2O$ 1 to 10, $Fe_2O_3$ 0.5 to 2, $SrO$ 0 to 7, $BaO$ 0 to 7, $Ce_2O_3$ 0 to 4, $CaO$ 0 to 2, $La_2O_3$ 0 to 2, $Nd_2O_3$ 0 to 1, $Pr_2O_3$ 0 to 0.5, $P_2O_5$ 0 to 0.5, $ZrO_2$ 0 to 0.5, $Sb_2O_3$ 0 to 0.5, $TiO_2$ 0 to 0.5, $MgO$ 0 to 0.2, $MnO$ 0 to 0.1, wherein the chloride ion content is from 0.013 to 0.05 weight % and the sulphate ion content is from 0.03 to 0.15 weight %, and (ii) providing a second granular composition (B) comprising expressed in terms of weight percent on an oxide basis: $CaO$ 80 to 99, $SiO_2$ 1 to 10, $Fe_2O_3$ 0.1 to 1.5, $MgO$ 0 to 8, $Al_2O_3$ 0 to 3, $BaO$ 0 to 2, $K_2O$ 0 to 0.4, $Na_2O$ 0 to 0.2, $SrO$ 0 to 0.2, $MnO$ 0 to 0.2, $Ce_2O_3$ 0 to 0.1, $La_2O_3$ 0 to 0.1, $Pr_2O_3$ 0 to 0.1, $P_2O_5$ 0 to 0.1, $Nd_2O_3$ 0 to 0.1, $TiO_2$ 0 to 0.1, wherein the chloride ion content is from 0.001 to 0.008 wt % and the sulphate ion content is from 0.01 to 0.04 wt %, and (iii) mixing granular compositions (A and B) to form a substantially homogeneous cementitious mixture.

39 Claims, 10 Drawing Sheets

CEMENTITIOUS MIXTURE

The present invention relates to a process for making a cementitious mixture and, in particular, a cementitious mixture which comprises a filter cake waste material. The inclusion of such a cementitious mixture in concrete results in an improvement in cohesion, workability and compressive strength and provides a less porous structure compared with many of the known cements. The present invention also provides a new process for disposing safely of certain filter cake waste materials.

Known materials produced from cementitious mixtures generally fall into two groups: mortars and concretes. Mortars and concretes include a filler and a hydraulic or non-hydraulic cement. Fillers are typically classified as either fine or coarse aggregates. Fine aggregates, such as sand, generally have a particle size of less than about 5 mm size. Coarse aggregates, such as gravel, generally have a particle size of greater than about 5 mm. Whilst concretes and mortars commonly contain fine aggregates, only concretes contain coarse aggregates.

The purpose of the cement is to coat the aggregate particles and to bond the aggregates into a monolithic product. Hydraulic cements harden by the chemical reaction of hydration and common examples thereof include ordinary Portland cement (OPC), limestone, gypsum plaster, lime, ground granulated blast furnace slag (GGBS), pulverised fuel ash (PFA) and pozzolanic materials. The essential binding component formed when the cement hardens upon addition of water is calcium silicate hydrate (CSH) or tobomorite gel. Owing to the very complicated chemistry of cements, it is common practice to use a reduced nomenclature, where $CaO=C$, $Al_2O_3=A$, $SiO_2=S$ and $H_2O=H$.

It is estimated that thousands of tonnes of waste filter cake material go to landfill sites in Great Britain annually. Consequently, a method of disposing safely with such a material would be beneficial to the environment. The present invention addresses this problem and, furthermore, provides a cementitious mixture which can be used in the construction industry and which possesses properties which substantially match and, in some cases, exceed the properties of conventional cements.

Accordingly, in a first aspect the present invention provides a process for making a hydraulic cementitious mixture, which process comprises the steps of:

(i) providing a first granular composition (A) comprising:

|  | Weight % |
| --- | --- |
| $SiO_2$ | 55–80 |
| $Al_2O_3$ | 10–20 |
| $Na_2O$ | 1–10 |
| $K_2O$ | 1–10 |
| $Fe_2O_3$ | 0.5–2 |
| SrO | 0–7 |
| BaO | 0–7 |
| $Ce_2O_3$ | 0–4 |
| CaO | 0–2 |
| $La_2O_3$ | 0–2 |
| $Nd_2O_3$ | 0–1 |
| $Pr_2O_3$ | 0–0.5 |
| $P_2O_5$ | 0–0.5 |
| $ZrO_2$ | 0–0.5 |
| $Sb_2O_3$ | 0–0.5 |
| $TiO_2$ | 0–0.5 |
| MgO | 0–0.2 |
| MnO | 0–0.1 | wherein the chloride content in composition (A) is from 0.013 to 0.05 weight % and the sulphate ion content is preferably from 0.03 to 0.15 weight %, and (ii) providing a second granular composition (B) comprising:

|  | Weight % |
| --- | --- |
| CaO | 80–99 |
| $SiO_2$ | 1–10 |
| $Fe_2O_3$ | 0.1–1.5 |
| MgO | 0–8 |
| $Al_2O_3$ | 0–3 |
| BaO | 0–2 |
| $K_2O$ | 0–0.4 |
| $Na_2O$ | 0–0.2 |
| SrO | 0–0.2 |
| MnO | 0–0.2 |
| $Ce_2O_3$ | 0–0.1 |
| $La_2O_3$ | 0–0.1 |
| $Pr_2O_3$ | 0–0.1 |
| $P_2O_5$ | 0–0.1 |
| $Nd_2O_3$ | 0–0.1 |
| $TiO_2$ | 0–0.1 | wherein the chloride ion content in composition (B) is from 0.001 to 0.008 wt. % and the sulphate ion content is preferably from 0.01 to 0.04 wt. %, and (iii) mixing granular compositions (A) and (B) to form a substantially homogeneous cementitious mixture.

By blending compositions (A) and (B) together at a given ratio it is possible to improve the rate of hydration and also reduce porosity, thereby providing a higher earlier strength than GGBS and PFA. Granular compositions (A) and (B) are preferably mixed in relative proportions to form a substantially homogenous cementitious mixture having a total chloride ion content of 0.02 wt. % or less in order to meet industry standards for reinforced concrete.

The oxide composition of the materials may be assessed using conventional techniques including, for example: US Environmental Protection Agency procedure USEPA SW-846 method 3051 (November 1990) for microwave digestion (nitric acid) to dissolve samples for analysis in solution, lithium metaborate fusion to prepare solutions for major element determination, ICP-Atomic Emission Spectrometry for determination of major oxides (except silica) and trace metals, X-ray fluorescence (silica), ICP-Mass Spectrometry for determination of rare earth elements. Soluble chloride and sulphate ion contents may be determined by ion chromatography.

Loss on Ignition (EN 196-2 section 7, EN 197) tests may also be carried out to determine amount of volatile matter by drying the starting materials at approximately 110° C., followed by heating at 925° C. to 975° C. ±25° C. At this temperature carbonates, for example calcium carbonate, decompose to the oxide and $CO_2$ is given off. This results in a loss of weight. The samples may then be analysed by the conventional techniques above, the chemical composition being expressed in terms of weight percent on the basis of the oxide, excluding the weight of the volatile material. Insoluble residues can be determined EN-196-2 Section 9.

Both compositions (A) and (B) may contain trace amounts of rare earth elements or oxides thereof, including Lutetium, Thulium, Holmium, Ytterbium, Terbium, Erbium, Yttrium, Europium, Dysprosium, Samarium and Gadolinium.

In general, the weight ratio of composition A to composition B will be in the range of from 1:4 to 4:1, more preferably from 1:1 to 7:3. For example, if both compositions (A) and (B) were blended on a 1.1 basis, then the silica content in the resulting mixture would be approximately the same as that of GGBS, whilst the alumina content would be approximately the same as that of OPC, although the calcium oxide content would remain lower than either GGBS or OPC. On a 3:7 basis, the silica content would be approximately the same as that of OPC, and the calcium oxide approximately the same as that of GGBS. Therefore the relative amounts of compositions (A) and (B) to be included in the cementitious mixture can be derived from the required performance of the cement.

If the weight ratio of composition A to composition B is chosen to be in excess of 1:1, then the silica content in the mixture will generally be present in an amount of from 40 to 70 wt. %, more typically from 45 to 60 wt. %, whilst the alumina content will typically be present in an amount of from 5 to 20 wt. %, more typically from 8 to 15 wt. %. Such levels of alumina and silica are higher than those found in OPC and have been found to result in higher compressive strengths in the early stages (1 to 7 days) of hydration, and substantially the same compressive strength at 28 days compared with OPC for the same water ratio. The higher levels of alumina also mean that higher water ratios can be used compared with OPC, whilst still maintaining equivalent mechanical properties. This is because the higher levels of alumina and silica form a gel paste, which improves the performance of the material, and the strength gain compensates for the increase in water demand. This is advantageous because higher water ratios facilitate mixing and processing. In addition, the relatively high silica levels improve the CSH gel at the aggregate-cement paste interface. Also the amount of free lime is reduced in the composition during reaction with the soluble silica in composition (A), thus reducing the risk of efflorescence in the concrete.

The use of the cement according to the present invention in the manufacture of concrete provides a more cohesive mix compared with OPC, and the slump of the concrete is reduced considerably. Additionally, the cementitious mixture is very mobile when vibrated and this improves compaction, being particularly suited to pumped concrete. The initial or plastic set is reduced and bleeding of the concrete is also reduced. Furthermore, the bulk density of the new material is lower than that of other cement replacements which are currently available. This is advantageous because it results in improved thermal properties and reduced weight in constructional components.

If the cement is to be used in prestressed concrete applications, then granular compositions (A) and (B) are advantageously mixed in relative proportions to form a substantially homogenous cementitious mixture having a total chloride ion content of 0.01 wt. % or less.

Preferably, granular compositions (A) and (B) are mixed in relative proportions to form a substantially homogenous cementitious mixture having a total $Na_2O$ content of 3 wt. % or less, more preferably 2 wt. % or less. Preferably, granular compositions (A) and (B) are mixed in relative proportions to form a substantially homogenous cementitious mixture having a total $K_2O$ content of 4 wt. % or less, more preferably 3 wt. % or less. Such levels can generally be achieved for a weight ratio of composition (A) to composition (B) in the range of from 3:7 to 7:3.

A particularly preferred composition (A) comprises:

| | Weight % |
|---|---|
| $SiO_2$ | 60–75 |
| $Al_2O_3$ | 10–15 |
| $Na_2O$ | 1–5 |
| $K_2O$ | 1–6 |
| $Fe_2O_3$ | 0.8–1.5 |
| CaO | 0.1–1 |
| SrO | 1–4 |
| BaO | 1–5 |
| $Ce_2O_3$ | 0.2–2.5 | wherein the chloride ion content in composition (A) is from 0.02 to 0.03 wt. % and the sulphate ion content is from 0.05 to 0.09 wt. %.

A particularly preferred composition (B) comprises:

| | Weight % |
|---|---|
| CaO | 83–96 |
| $SiO_2$ | 2–7 |
| $Fe_2O_3$ | 0.2–0.8 |
| $Al_2O_3$ | 0.5–1.5 |
| $Na_2O$ | 0.03–0.12 |
| $K_2O$ | 0.1–0.2 |
| MgO | 2–6 | wherein the chloride ion content in composition (B) is from 0.002 to 0.006 wt. % and the sulphate ion content is from 0.015 to 0.03 wt. %.

Advantageously both granular compositions (A) and (B) have an average grain size of 20 μm or less. This enables any aggregates to be fully coated at the aggregate-cement paste interface.

Composition (A) will typically have a pH of from 9.5 to 10.5, whilst composition (B) will typically have a pH of from 9.0 to 10.0. The resulting substantially homogenous cementitious mixture of compositions (A) and (B) generally has a pH of from 9.5 to 10.5, more typically from 9.8 to 10.2.

Composition (A) preferably comprises or consists of a filter cake material, which may be obtained by collecting the filterisation of waste from a glass panel making process, for example electronic glass for television and monitor screens. It will be appreciated, however, that any filter cake material satisfying the requirements of composition (A) or blended to the requirements of composition (A) may be used. The waste material is formed from a slurry until it is in a clay-like form at which time it is classed as filter cake. The filter cake material has a high silica content which is used to fill any voids that are present in the concrete and to enhance the performance of the cement gel. The silica content is higher than any of the other cements presently in use. The alumina and iron oxide contents are higher than OPC and GGBS, but lower than that of PFA. Calcium oxide is either not present, or present in relatively small amounts; it is, however, added during the blending process by the addition of composition (B). By its very nature, the filter cake material also has relatively high contents of chlorides and sulphates in its raw form. The filter cake material can be split between soluble and insoluble materials of which the insoluble material is used as a filler material. In general, soluble chlorides are present in an amount of from 130 to 500 mg/kg, more typically from 200 to 300 mg/kg, still more typically from 220 to 280 mg/kg; soluble sulphate from 300 to 1500 mg/kg, more typically from 500 to 900 mg/kg; soluble fluorides From 20 to 200 mg/kg, more typically from 50 to 150 mg/kg; and soluble phosphates from 100 to 300 mg/kg, more typically from 150 to 250 mg/kg. Soluble cations are dominated by sodium, typically present in an amount of from 1000 to 3000 mg/kg, and potassium typically present in an amount of from 100 to 900 mg/kg. The amount of soluble silica is typically in the range of from 700 to 2000 mg/kg, more typically from 1000 to 1700 mg/kg. It will be appreciated that trace elements such as, for example, Zn, Ga, Be, Ni, Se, Y, Sm, Eu, Gd, Dy, Hf, Tb, U may be present each independently in amounts of from 0.001 to 0.1 wt/ %. The total rare earth oxide content in the filter cake material is typically up to 2 wt. %, more typically up to 1 wt. %.

Mineralogical analysis by X-ray diffraction of the aforementioned filter cake material reveals that it is predominately amorphous, which is to be expected for a material dominated by pumice. Crystalline rare earth salts are suggested by a match for XRD peaks with a strontium nitride oxide. The poorly crystalline silica mineral moganite may also be present within the pumice.

Another benefit of using the aforementioned filter cake material is that it has a higher pH value than conventional cements. Whilst not wishing to be constrained by theory, it is believed that the higher pH value decreases the effect of carbonation when used in reinforced concrete by increasing the protection of the passivity layer. This in turn gives a better oxide layer and provides improved protection from reactions with oxygen and water. This fact, combined with the lower porosity of the final concrete material, significantly improves protection in reinforced concrete applications.

Composition (B) has a high calcium carbonate or calcium oxide content and preferably comprises or consists of limestone, which may be obtained from dust extraction during quarrying. The crushing process creates a significant amount of dust, which is extracted from the air and then collected into storage hoppers. It is a very fine material and is classed as filler dust or ground limestone. It will be appreciated that the chemical composition for composition (B) has been expressed in terms of the oxides. Composition (B) may also comprise or consist of ordinary Portland cement, lime and/or gypsum plaster.

The chloride ion content in the filter cake material will often be present in amount of in excess of 0.02 wt. %, which is too high for reinforced concrete applications. When it is blended with the ground limestone the chloride ion content can be reduced to 0.02 wt. % or less to therefore meet the criteria for reinforcing. For prestressed concrete applications, the final chloride ion content should be reduced to 0.01 wt. % or less by blending appropriate amounts of the filter cake material and the ground limestone.

Both the filter cake material and the ground limestone have small particle sizes and advantageously have an average particle size of 75 $\mu$m or less, preferably 40 $\mu$m or less, more preferably 20 $\mu$m or less, still more preferably 15 $\mu$m or less. From a particle size analysis (Mixermill 2000 series apparatus) substantially all of the particles will typically have a grain size of 50 $\mu$m or less; from approximately 90 to 99% will have a particle size of 30 $\mu$m or less; from approximately 70 to 90% will have a particle size of 20 $\mu$m or less; from approximately 50 to 70% will have a particle size of 10 $\mu$m or less; and from approximately 40 to 50% will have a particle size of 5 $\mu$m or less. The end product after processing is consequently smaller in particle size than that of OPC and this enables the aggregates to be substantially fully coated at the aggregate-cement paste interface. This is a major benefit, since a lack of coating at the aggregate-cement paste interface is known to be a source of weakness in concrete.

Prior to blending, both compositions (A) and (B) may be dried in a rotary drier. As the material dries out and breaks down, the dust particles can be extracted by air through a particle size sieve with a second extraction fan at higher speed sucking the dust particles through a duct system and diverted into a holding hopper to be left to cool down. The remainder of the material can then be crushed and recycled back through the system. Compositions (A) and (B) may be processed separately through the same system. Hazardous waste regulations may be applied up to the stage where the material is fed into the rotary kiln. After this, compositions (A) and (B) can be screw-fed through grinding and blending stages to be stored in their respective silos. Compositions (A) and (B) can then be belt-fed into a rotary drying kiln for a full drying cycle and then screw fed from the rotary dryer to a grinder where the material is ground to a fine powder. Next, compositions (A) and (B) can be screw-fed from the grinder to the respective holding hopper and subsequently blended in a conventional manner at a given ratio in accordance with the grade of material required. The blended material can then be stored in silos at customer sites and despatched to mixers in a manner conventional in the art. The materials can be processed by drying at a relatively low temperature of up to approximately 200° C., hence saving on production costs as well as benefiting the environment.

In use, the cementitious mixture forms a gel which fills the aggregate-cement paste interface and also any other voids that are present in the concrete. Accordingly, the quantity of material required will be dependent on the quality of the mix design and the grading of any coarse and/or fine aggregates. The lower the percentage of composition (B), the lower the gain in strength; the higher the percentage of composition (A), the higher the water demand, because the material is being used a filler. The result of this is a lower early strength and an equal or greater strength at approximately twenty eight days compared with OPC. For certain applications a lower early strength is advantageous. For example, for large constructional pours, where a reduction in temperature rise during hydration is advantageous because it minimises the risk of thermal cracking.

In one preferred aspect of the present invention, granular hydrated lime is added to the substantially homogenous cementitious mixture comprising compositions (A) and (B). This results in an improvement in compressive strength over GGBS, PFA and OPC, at least up to 28 days. Granular hydrated lime may be added to the cementitious mixture typically in an amount of up to 30 wt. % based on the total weight of compositions A and B, preferably up to 20 wt. %, more preferably up to 15 wt. %. For certain applications a higher early strength is advantageous. For example, a high early strength improves the time factor for striking formwork, allows early demoulding of precast units and allows normal concrete production during cold weather.

In another aspect of the present invention, up to 35 wt. % of granular hydrated lime is added to a substantially homogenous cementitious mixture comprising from 5 to 40 wt. % of composition (A) and from 60 to 95 wt. % ordinary Portland cement.

Granular kaolinite, granular china clay or a mixture thereof is/are advantageously added to the substantially homogenous cementitious mixture comprising compositions (A) and (B). Such materials further dilute the quantity of chlorides, nitrates, sulphates, potassium oxide and sodium oxide in composition (A). This enhances the performance of the concrete and give a higher earlier strength, which is advantageous in certain applications. Granular kaolinite and/or china clay may be added to the cementitious mixture typically in an amount of up to approximately 30 wt. % based on the total weight of compositions A and B. The addition of granular kaolinite and/or china clay is especially beneficial in circumstances where the weight ratio of composition (A) to composition (B) in the cementitious mixture is greater than 1:1, for example at a ratio of 7:3. The use of granular kaolinite and china clay reduces the total potassium and sodium contents to levels such that the product can be used as a sulphate resistant material.

The process according to the present invention may further include the step of adding to the substantially homogenous cementitous mixture comprising compositions (A) and (B) one or more of OPC, PFA, GGBS, paper sludge ash and/or a pozzolanic material.

In order to make concrete or mortar, the process further includes the step of adding to the substantially homogenous cementitious mixture comprising compositions (A) and (B) a fine aggregate, a coarse aggregate or a mixture thereof. It will be appreciated that the process may further include the step of adding water to the substantially homogenous cementitious mixture comprising compositions (A) and (B). It will also be appreciated that the process may include the step of adding a colouring agent, an accelerator, a binder, microsilica, silica fume, a superplasticizer, a polyer, fibres or a mixture of two or more thereof.

For concrete samples, the dominant soluble ions are calcium, typically present in an amount of up to 30000 mg/kg, more typically up to 15000 mg/kg, consistent with the presence of portlandite (calcium hydroxide). Potassium ions are typically present in an amount of up to 10000 mg/kg, more typically up to 5000 mg/kg. The soluble silica content is reduced significantly compared with the aforementioned filter cake material. This may be a result of reaction with calcium in solution to precipitate calcium silicates.

For non-constructional concrete, the blends according to the present invention may exhibit a Loss on Ignition (EN 196-2 section 7, EN 197) of greater than 8%. However, for constructional concretes, the Loss on Ignition should be 8% or less. The inventors have found that this may be achieved by including GGBS in the blend and reducing the level of lime and/or limestone. Advantageously, the Loss on Ignition is 7% or less, more preferably, 4% or less, still more preferably approximately 3.5%.

The present invention also provides a hydraulic cementitious mixture comprising a substantially homogenous blend of granular compositions (A) and (B) as herein described, wherein the hydraulic cementitious mixture has an average grain size of 40 $\mu$m or less, preferably 20 $\mu$m or less, a total chloride ion content of 0.02 wt. % or less and a pH of from 9.5 to 10.5. The particle size analysis as described above is preferably also linked to this aspect of the present invention.

In an alternative embodiment of the present invention there is provided a process for disposing of a waste filter cake material having a composition (A) as herein described, which process comprises the steps of:
   (i) providing composition (A) in granular form,
   (ii) providing a second granular composition (C) comprising ordinary Portland cement and optionally one or both of ground granulated blast furnace slag and/or pulverised fuel ash (PFA), and
   (iii) mixing granular composition (A) and (C) in relative proportions to form a substantially homogenous cementitious mixture having a total chloride ion content of 0.02 wt. % or less.

In this aspect of the present invention, filter cake waste material as herein described may act as a filler, as well as a cementitious product. This produces a retarding effect on the early strengths, but an equivalent strength at 28 days. In general the mixture will contain from 5 to 40 wt. % of the filter cake material, more preferably from 10 to 30 wt. % in relation to the OPC. It will be appreciated that the process may also include the step of adding one or more of the following materials as herein described: composition (B), hydrated lime, limestone, kaolinite, china clay, PFA, GGBS, a pozzolanic material, a fine aggregate, a coarse aggregate, a colouring agent, an accelerator, a binder, microsilica, silica fume, a superplasticizer, a polymer, fibres and water. The blend of waste filter cake material and composition (C) above may be used in the manufacture of concrete and mortar products. For prestressed concrete applications, the chloride ion content should be 0.01 wt. % or less. This embodiment of the present invention provides a unique way of disposing safely with waste filter cake material by using it as a filler in OPC, PFA and/or GGBS.

For some applications it is advisable to reduce the lime and/or limestone content in the concrete or mortar since lime is associated with the phenomena of "concrete cancer". A preferred cementitious mixture in this regard comprises the following blend: from 5 to 25 wt. % of composition (A), from 60 to 80 wt. % ordinary Portland cement, from 5 to 25 ground granulated blast furnace slag and/or pulverised fuel ash, and optionally up to 10 wt % hydrated lime and/or limestone. More preferably, the blend comprises: from 10 to 20 wt. % of composition (A), from 65 to 75 wt. % ordinary Portland cement, from 10 to 20 ground granulated blast furnace slag and/or pulverised fuel ash, and optionally up to 5 wt % hydrated lime and/or limestone. A further advantage of reducing the lime and/or limestone content or not including it at all in the blend is that the Loss on Ignition decreases. This is an important consideration for structural concrete applications.

The blast furnace slag may be provided in the form of granules, pellets or a coarse powder.

The present invention also provides for the use of a granular filter cake waste material as herein described in the manufacture of a hydraulic cement, a concrete product and/or a mortar product.

The present invention will now be described further with reference to the following drawings, in which.

Figure 1:
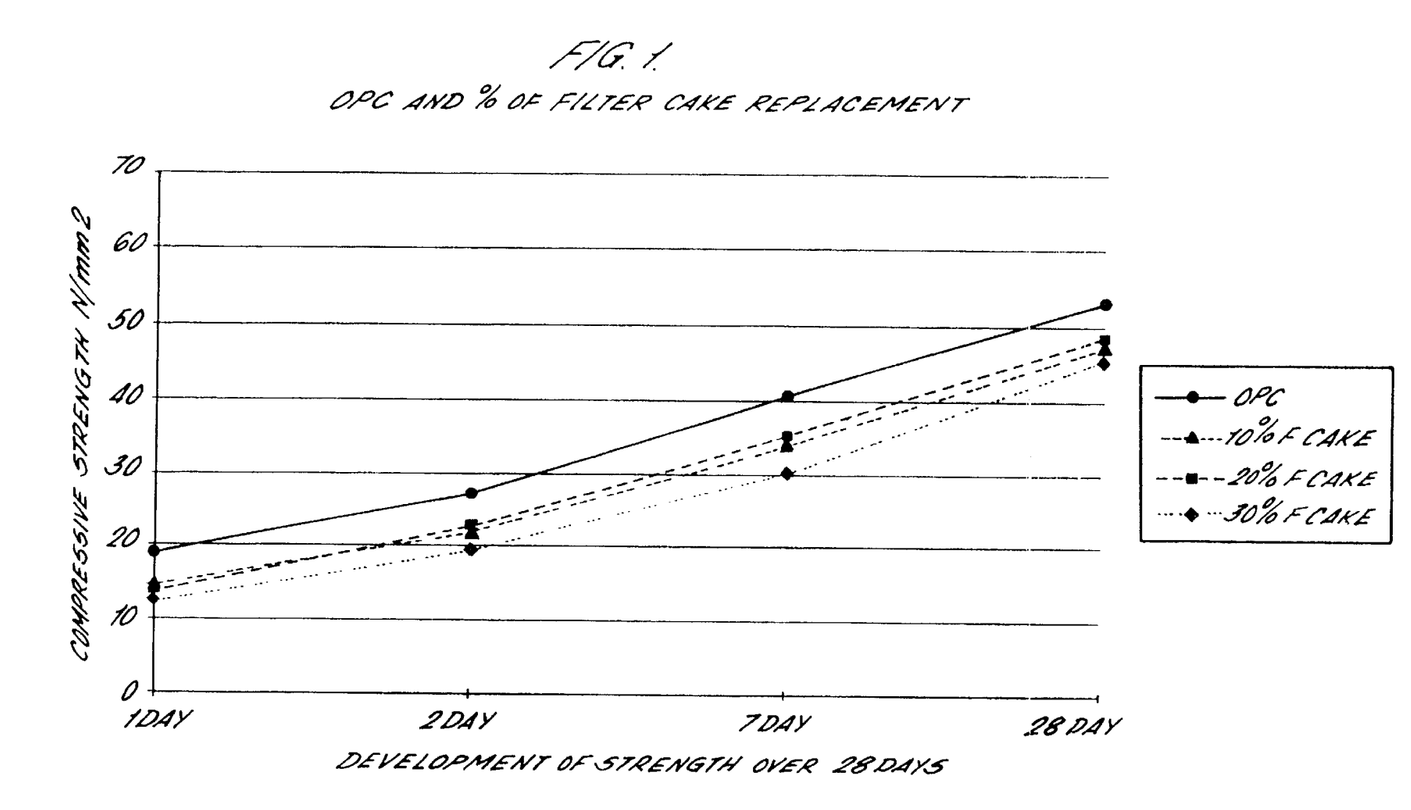
FIG. 1 is a graph of compressive strength vs time showing a comparison between OPC and various mixtures of OPC (90%, 80% and 70 wt. %) and a filter cake material (10%, 20% and 30 wt. %) as herein described.

A filter cake material was obtained as a waste material form a glass panel manufacturer (Ocean Technical Glass Ltd, Ocean Park, Cardiff CF1 5EN, UK known trading as Nippon Electric Glass (UK) Ltd at the same address). The filter cake comprised the following constituents expressed in terms of oxides: approximately 70 wt. % $SiO_2$, 15 wt. % $Al_2O_3$, 4 wt. % $Na_2O$, 5 wt. % $K_2O$, 1 wt. % $Fe_2O_3$, 2 wt. % SrO, 2 wt. % BaO, 1 wt. % Cao, and trace amounts of $Ce_2O_3$, $La_2O_3$, $Nd_2O_3$, $Pr_2O_3$, $ZrO_2$, $Sb_2O_3$ and $TiO_2$. This material was blended with OPC in the following approximate weight ratios 1:9, 2:8 and 3:7 (FC:OPC). With reference to FIG. 1, it can be seen that there is only a slight variation in strength gain over time between the 1:9 and 2:8 mixtures and there is only a marginal drop in compressive strength compared with pure OPC. The 3:7 mixture shows a slightly lower strength.

Figure 2:
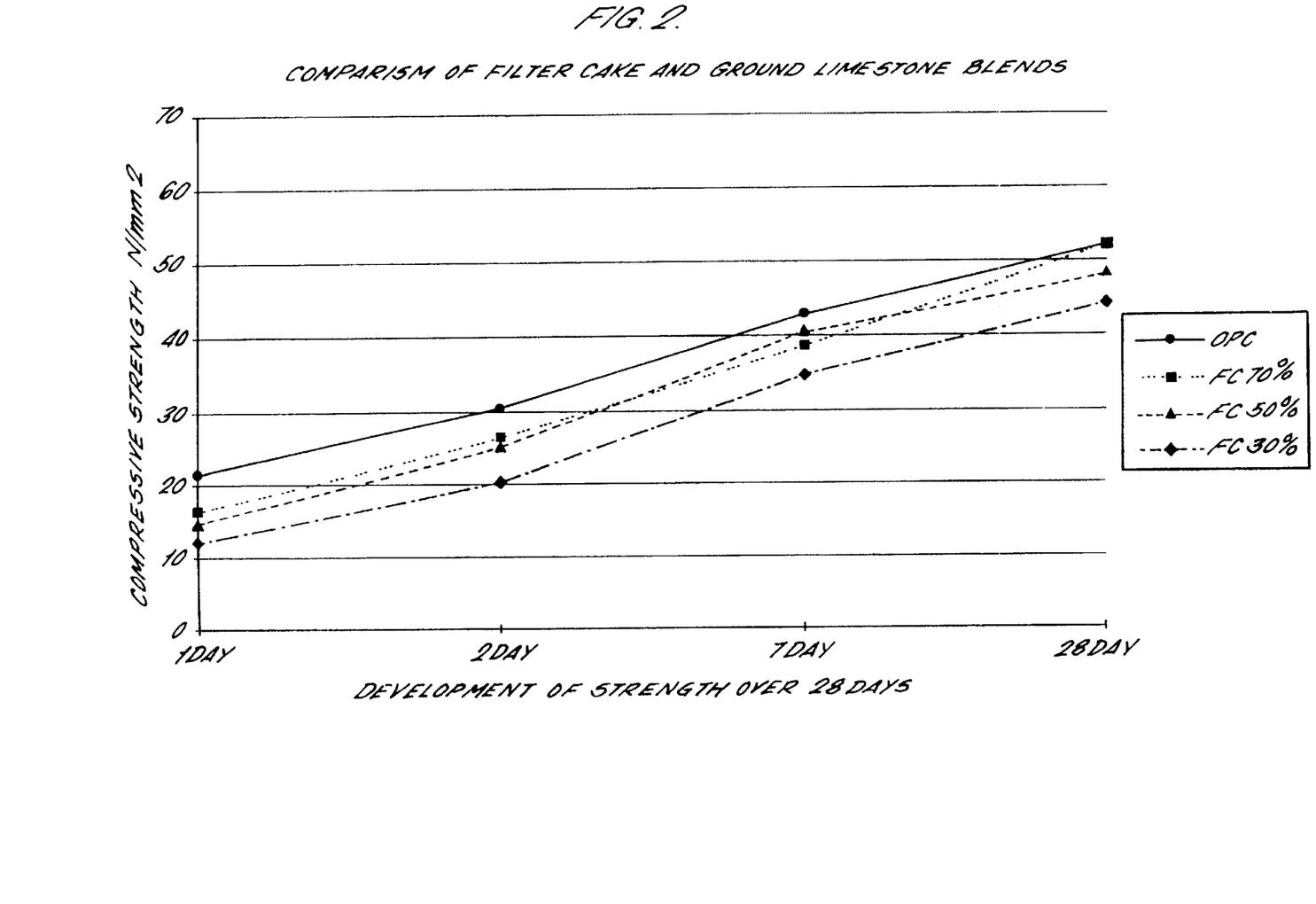
FIG. 2 is a graph of compressive strength vs time showing a comparison between (reference to the key down) (i) OPC, (ii) a mixture of OPC (70 wt. %) and a blend (30 wt. %) of a filter cake material (70 wt. %) and ground limestone (30 wt. %), (iii) a mixture of OPC (70 wt. %) and a blend (30 wt. %) of a filter cake material (50 wt. %) and ground limestone (50 wt. %), and (iv) a mixture of OPC (70 wt. %) and a blend (30 wt. %) of a filter cake material (30 wt. %) and ground limestone (70 wt. %).

Three mixtures of the filter cake material and ground limestone were prepared. At a weight ratio of about 7:3 (FC:GL), the first mixture comprised the following constituents: approximately 50 wt. % $SiO_2$, 17 wt. % CaO, 10 wt. % $Al_2O_3$, 3 wt. % $Na_2O$, 4 wt. % $K_2O$ and 1 wt. % $Fe_2O_3$. The second mixture of filter cake and ground limestone at a weight ratio of about 1:1 comprised the following constituents: approximately 36 wt. % $SiO_2$, 27 wt. % CaO, 8 wt. % $Al_2O_3$, 2 wt. % $Na_2O$, 3 wt. % $K_2O$ and 0.6 wt. % $Fe_2O_3$. Finally, the third mixture of filter cake and ground limestone at a weight ratio of about 3:7 comprised the following constituents: approximately 22 wt. % $SiO_2$, 38 wt. % CaO, 5 wt. % $Al_2O_3$, 1 wt. % $Na_2O$, 2 wt. % $K_2O$ and 0.5 wt. % $Fe_2O_3$. For each mixture the balance up to 100 wt. % was made up of Ba), SrO, $Ce_2O_3$, $La_2O_3$, $Nd_2O_3$, $Pr_2O_3$, $P_2O_5$, $ZrO_2$, $Sb_2O_3$, $TiO_2$, MgO and MnO. The three mixtures were then blended with OPC (70 wt % OPC, 30% of the mixture of filter cake and ground limestone). With reference to FIG. 2, it can be seen that there is little difference in strength gain between the 7:3 and 1:1 filter cake/ground limestone blends. The 1:1 blend has a slightly lower strength than pure OPC at all times, whilst the 7:3 blend substantially matches OPC at 28 days. The 3:7 blend exhibits a lower compressive strength.

Figure 3:
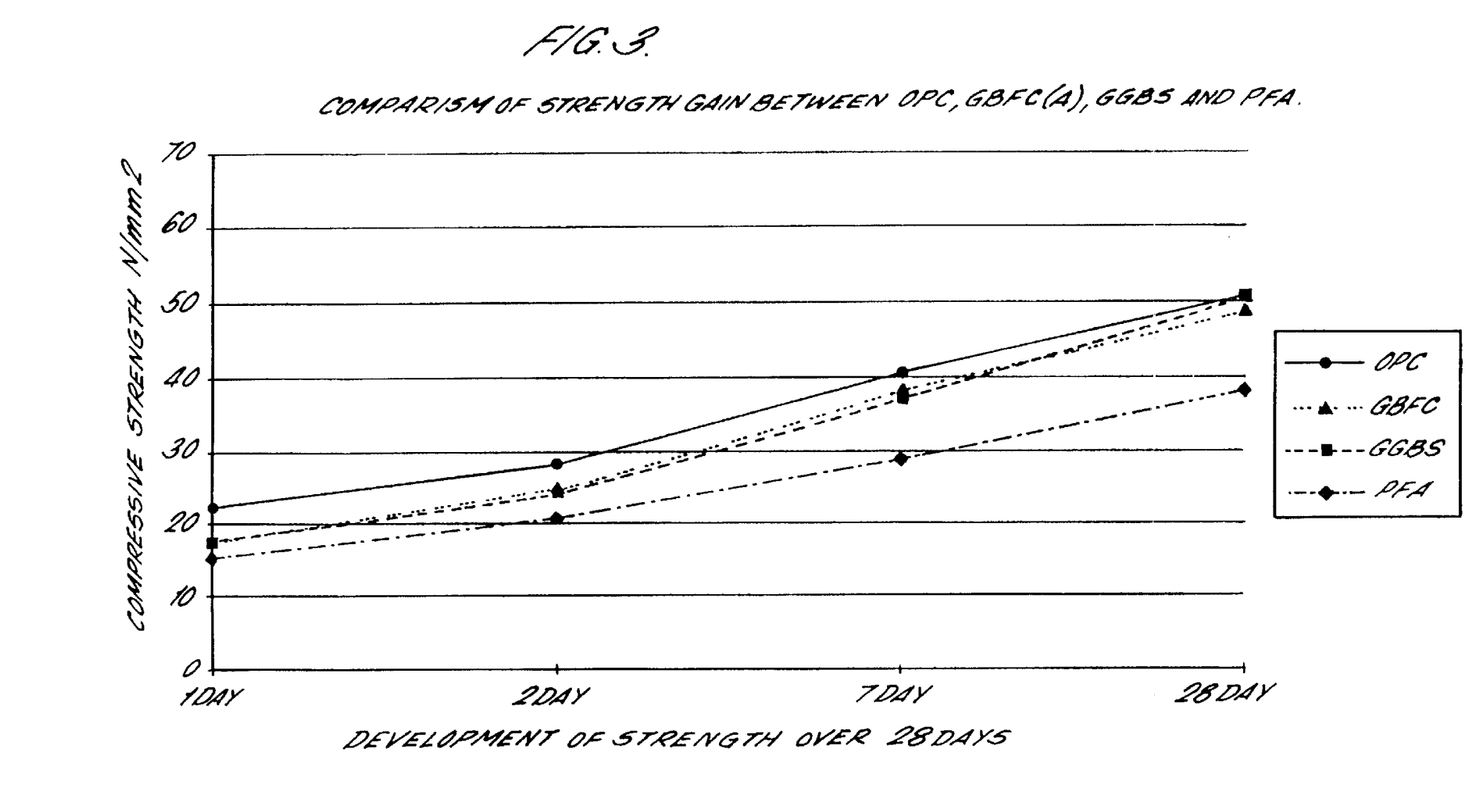
FIG. 3 is a graph of compressive strength vs time showing a comparison between (reference to the key down) (i) OPC, (ii) a mixture of OPC (70 wt. %), filter cake material (15 wt. %) and ground limestone (15 wt. %), (iii) a mixture of OPC (70 wt. %) and GGBS (30 wt. %) and (iv) a mixture of OPC (70 wt. %) and PFA (30 wt. %).

With reference to FIG. 3, the mixture of filter cake material and ground limestone at a weight ratio of about 7:3 can be seen to have a significantly higher strength gain over time compared with PFA and very similar strength gain characteristics to GGBS. The compressive strength at 28 days substantially matches that of OPC.

Figure 4:
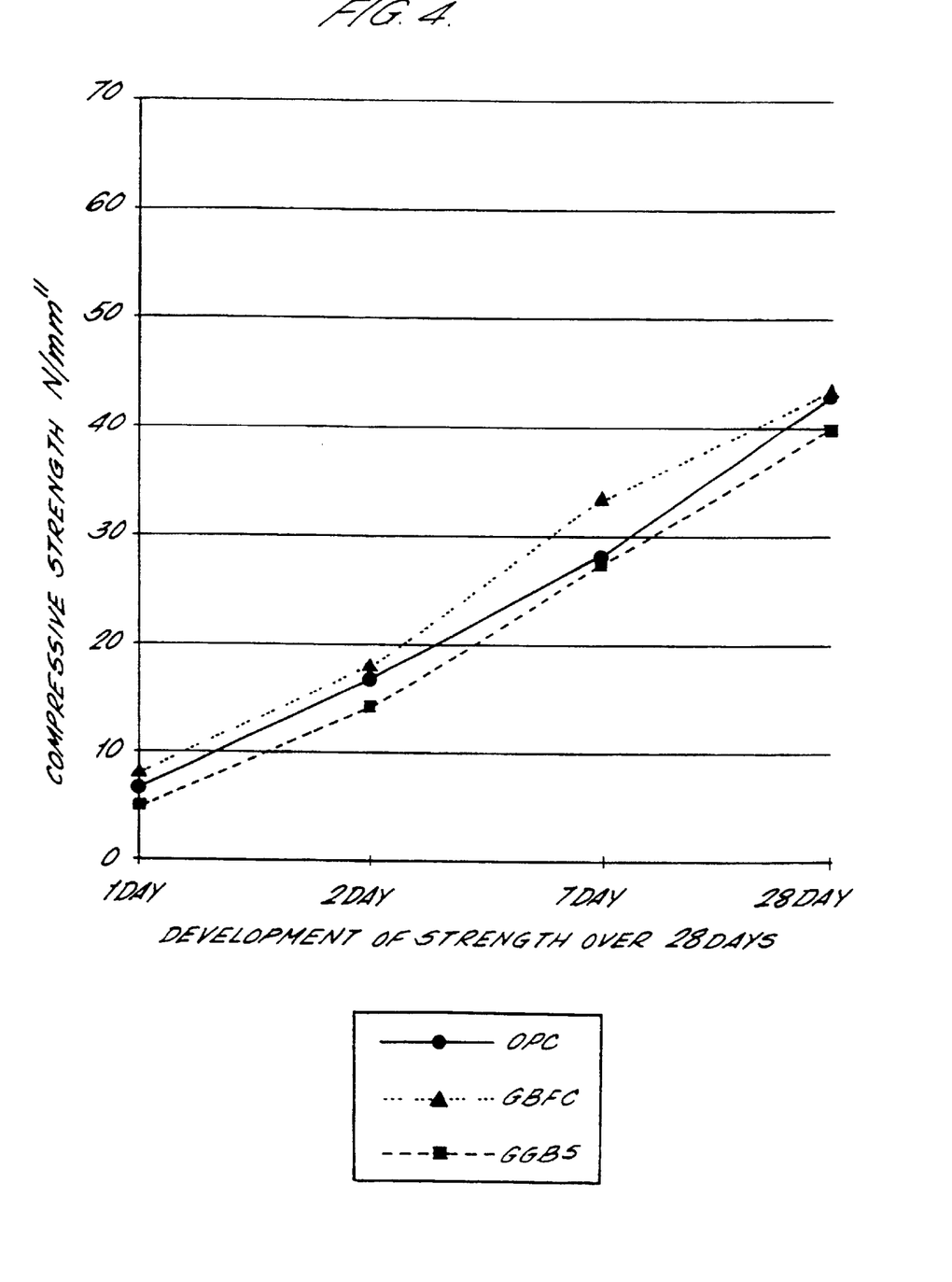
FIG. 4 is a graph of compressive strength vs time showing a comparison between (reference to the key down) (i) OPC, (ii) a mixture of OPC (70 wt. %) and a blend (30 wt. %) of a filter cake material (70 wt. %) and hydrated lime (30 wt. %) as herein described, (iii) a mixture of OPC (70 wt. %) and GGBS (30 wt. %).
Figure 5:
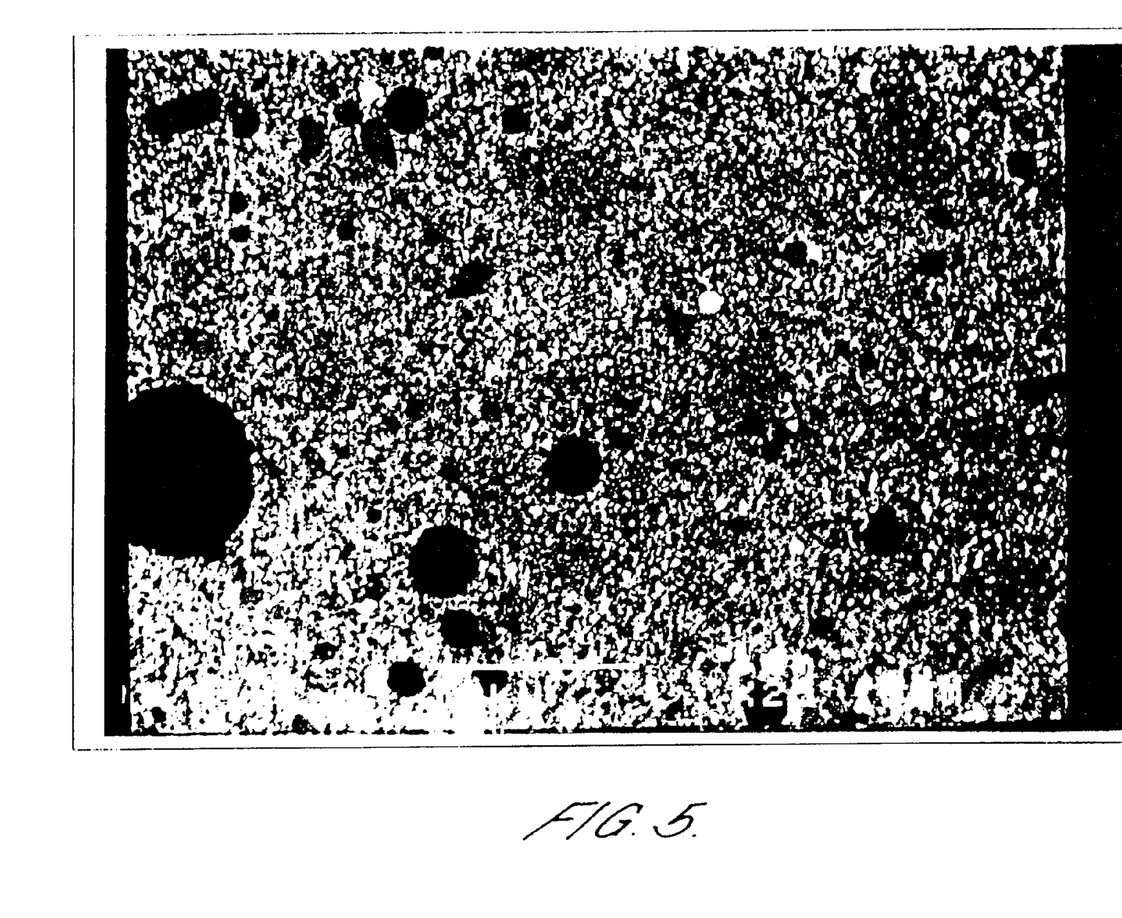
FIG. 5 is a scanning electron micrograph of a mortar comprising 63 wt. % sand, 21 wt. % OPC paste and 16 wt. % water (magnification×25).
Figure 6:
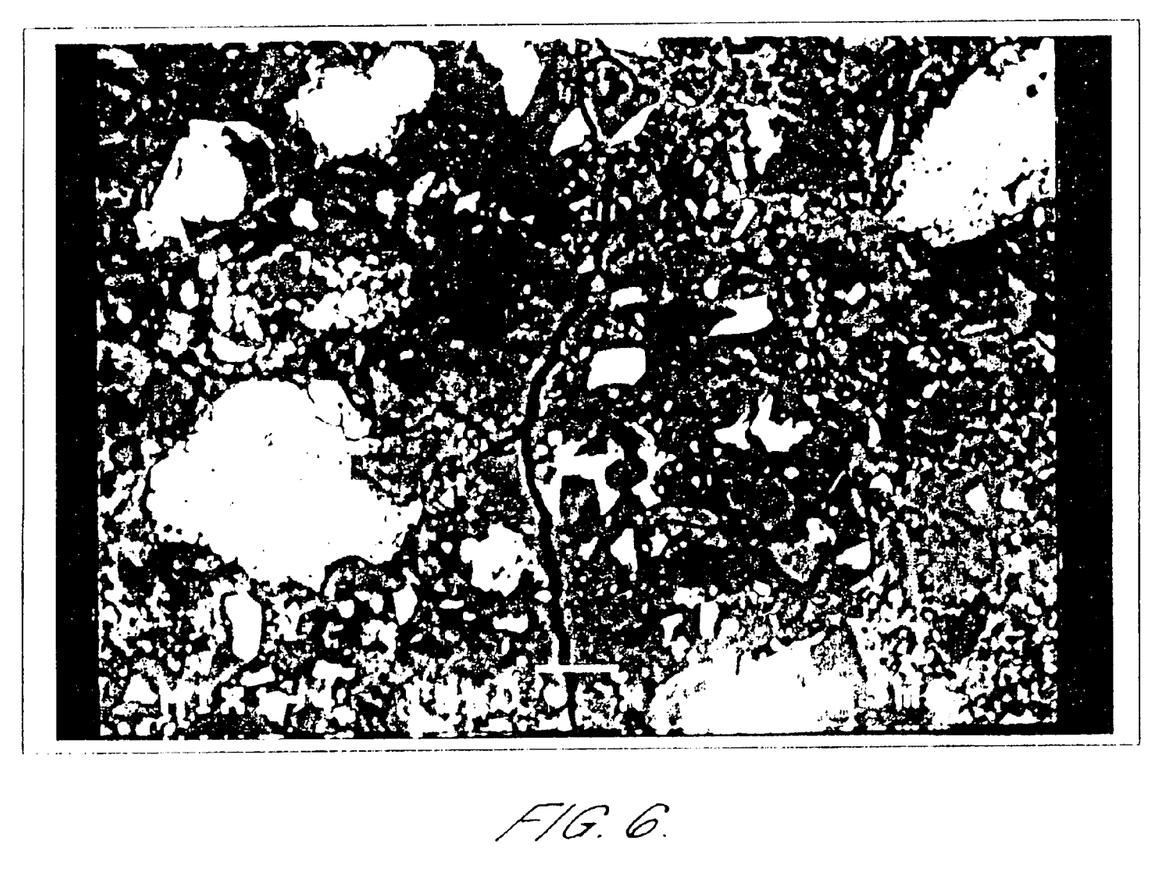
FIG. 6 is a scanning electron micrograph of the same mortar sample shown in FIG. 5 (magnification ×1000).
Figure 7:
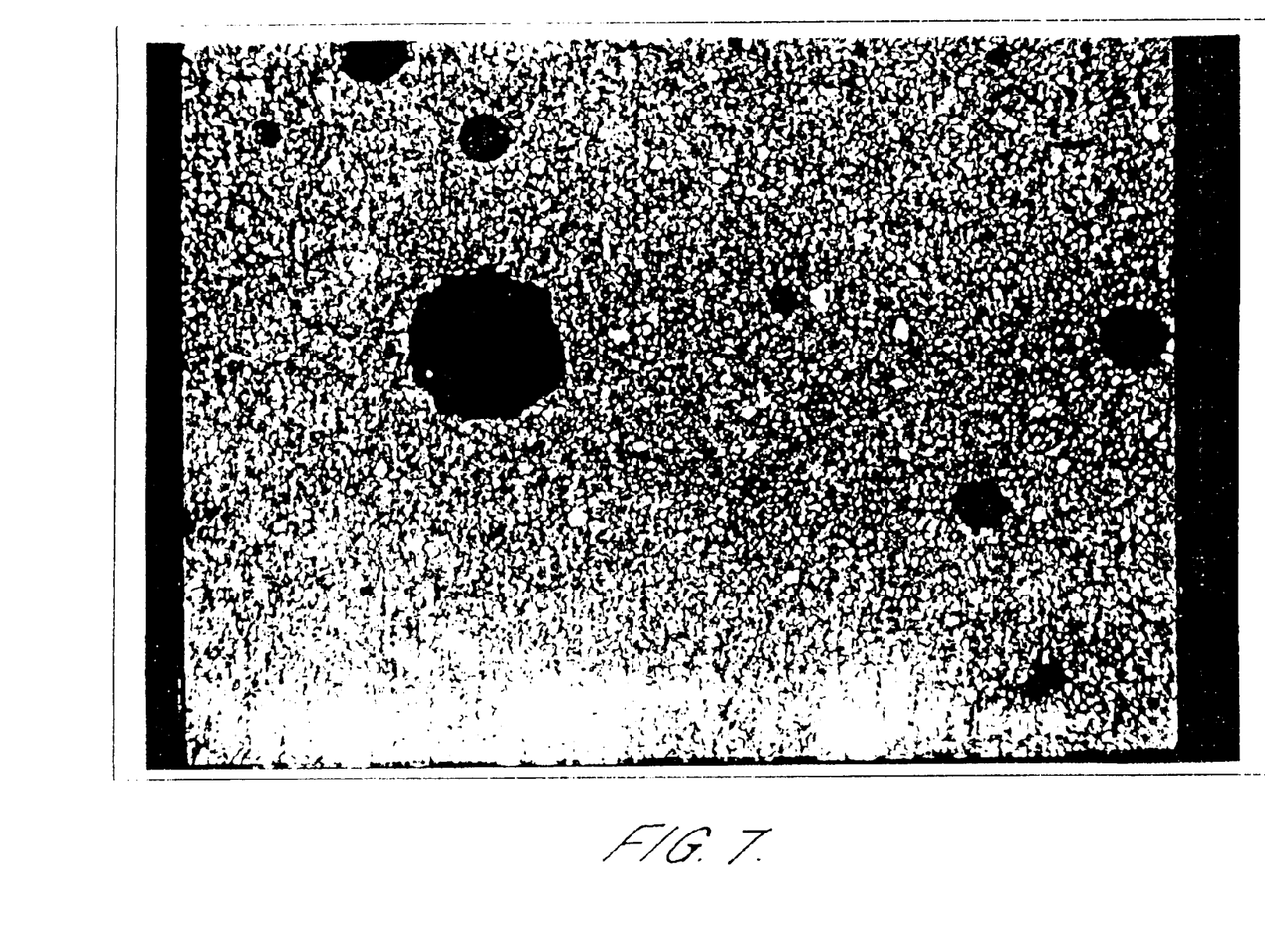
FIG. 7 is a scanning electron micrograph of a mortar comprising 63 wt. % sand, 16 wt. % OPC paste, 5 wt. % of a filter cake material as herein described and 16 wt. % water (magnification×25).
Figure 8:
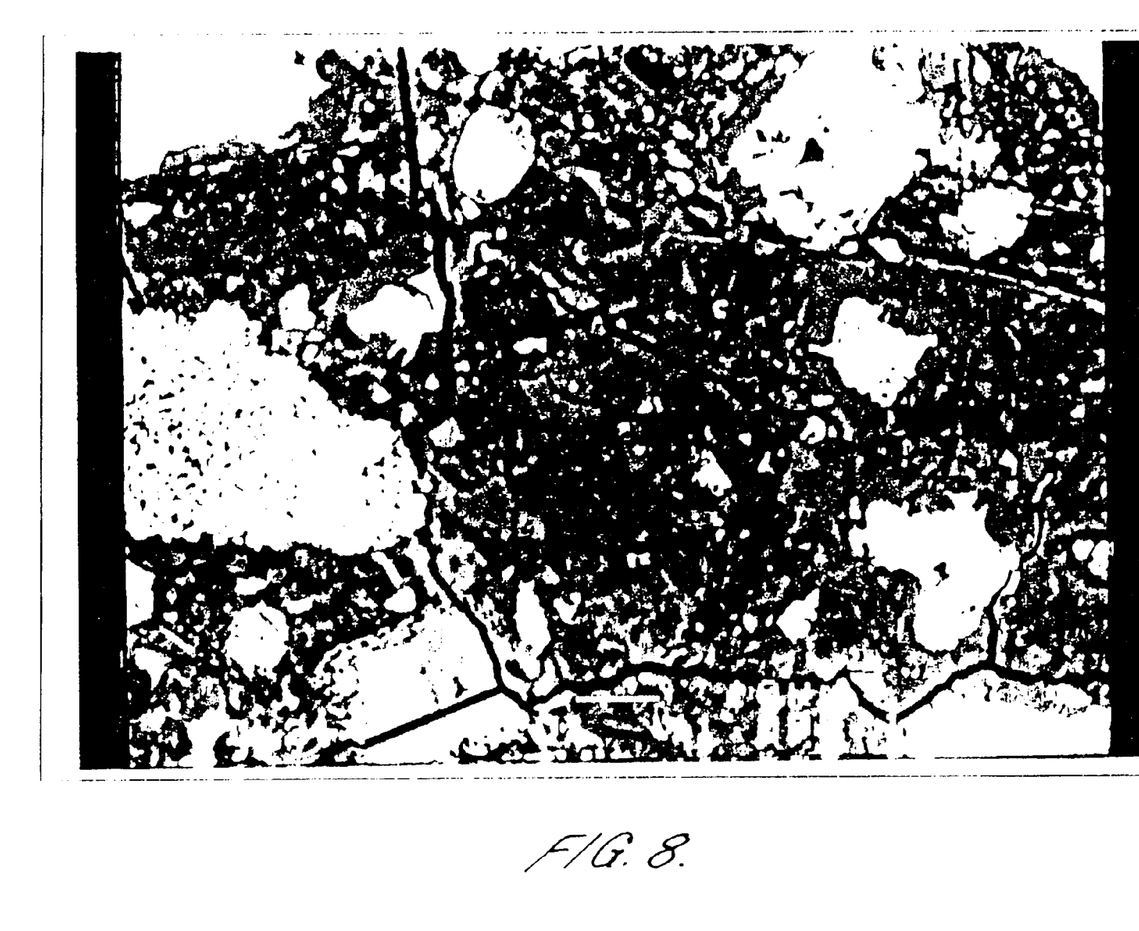
FIG. 8 is a scanning electron micrograph of the same mortar sample shown in FIG. 7 (magnification ×1000).

With reference to FIG. 4, it can be seen that the addition of hydrated lime (30 wt. %) to the filter cake (70 wt. %) has a dramatic effect on compressive strength. The compressive strength after 7 days is in excess of that of both OPC and GGBS, whilst at 28 days it approximately equal to OPC and greater than GGBS.

The performance and strength gain is created by the reaction of the cementitious mixture and the free lime released during the hydration process of the cement. The early strength gain is achieved by adding hydrated lime to the filter cake/ground limestone blend. Using this method it is possible to achieve the equivalent grades of class 42.5 N and 52.5 N cements, when using the product as a cement replacement.

Scanning electron microscopy (back-scattered electron images) was undertaken on a 28 day sample of a mortar (see FIGS. 5 to 8). From a comparison of FIGS. 5 and 7 (magnification ×25), it can be seen that the addition of the filter cake results in a more homogeneous texture. Furthermore, from a comparison of FIGS. 6 and 8 (magnification ×1000), it can be seen that porosity (shown as black) is reduced in the sample containing filter cake. The filter cake appears to be suitable as an inert filler. Differences in strength may reflect differences in porosity, as suggested by the SEM results. Additionally, the precipitation of calcium silicates in samples which use filter cake may contribute to the observed development of strength.

Figure 9:
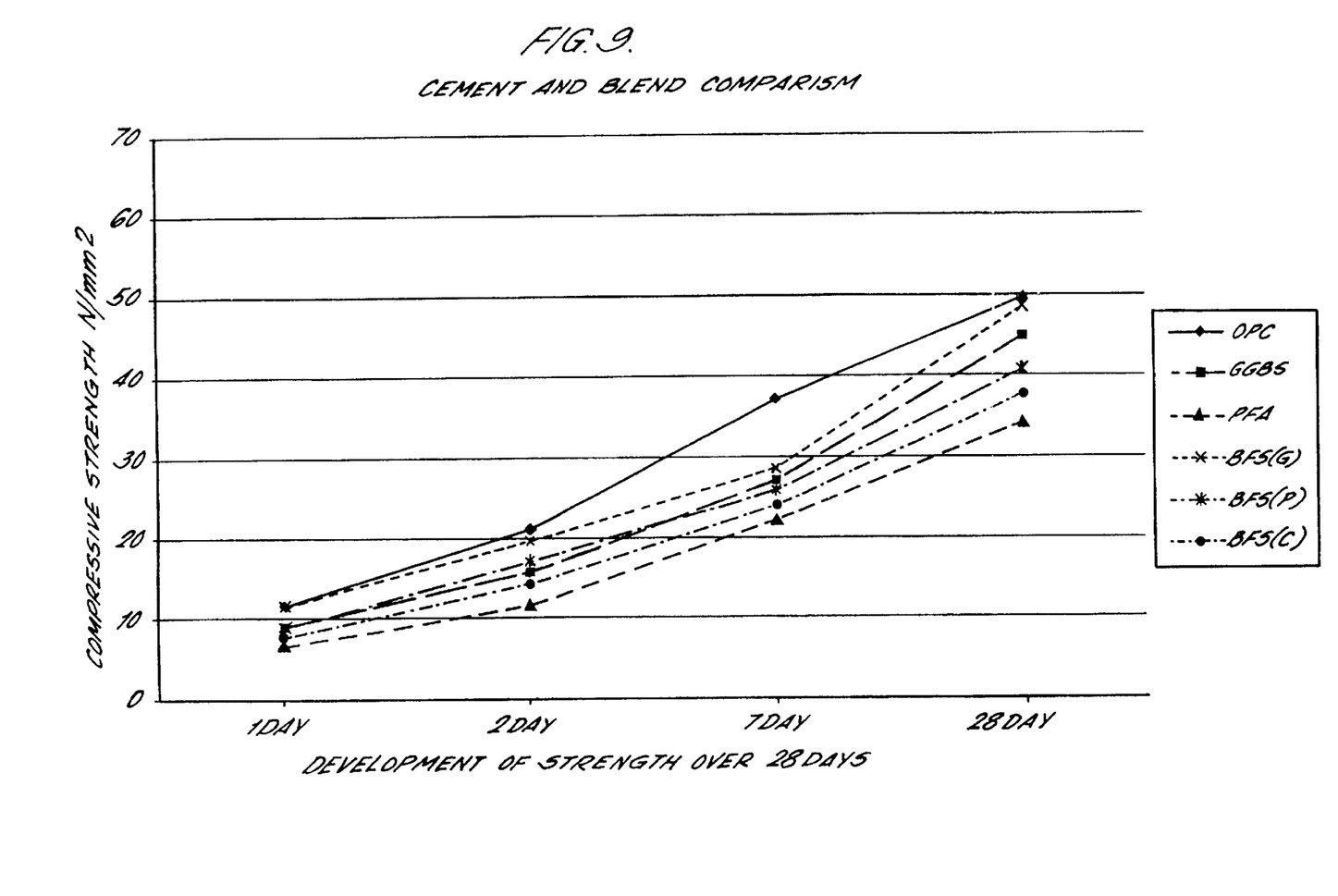
FIG. 9 is a graph of compressive strength vs time showing a comparison between (reference to the key down) (i) OPC, (ii) a mixture of OPC (70 wt. %) and GGBS (30 wt. %), (iii) a mixture of OPC (70 wt. %) and PFA (30 wt. %), (iv) a mixture of OPC (70 wt. %), filter cake (15 wt. %) and blast furnace slag (granulated) (15 wt. %), (v) a mixture of OPC (70 wt. %), filter cake (15 wt. %) and blast furnace slag (pelletised) (30 wt. %), and (vi) a mixture of OPC (70 wt. %), filter cake (15 wt. %) and blast furnace slag (coarse) (15 wt. %).
Figure 10:
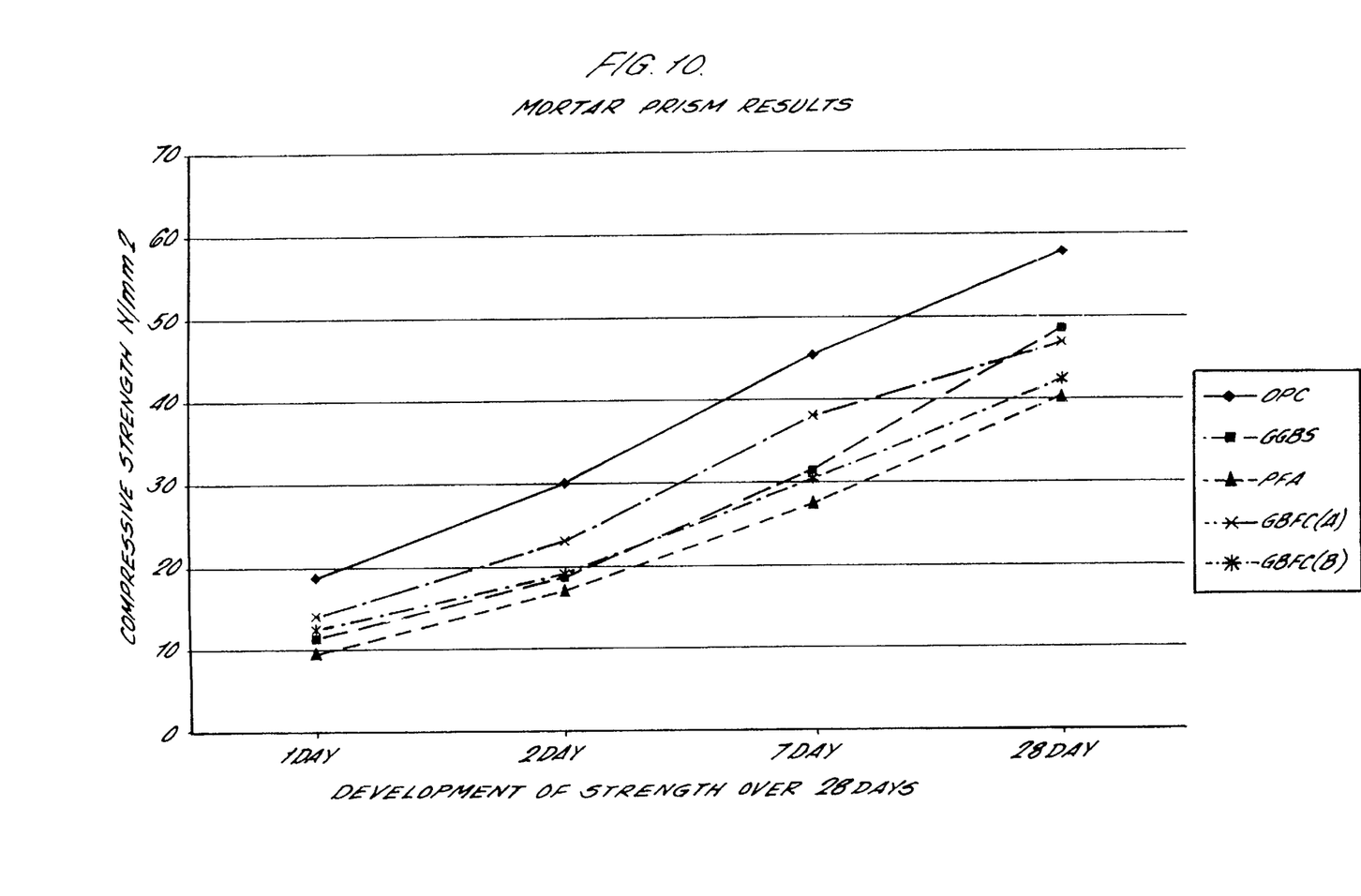
FIG. 10 is a graph of Mortar Prism results of compressive strength vs time showing a comparison between (reference to the key down) (i) OPC, (ii) a mixture of OPC (70 wt. %) and GGBS (30 wt. %), (iii) a mixture of OPC (70 wt. %) and PFA (30 wt. %), (iv) a mixture of OPC (70 wt. %), filter Cake (15 wt. %) and blast furnace slag (pelletised) (15 wt. %), (v) a mixture of OPC (70 wt. %) and 30 wt. % of a blend of filter cake, limestone and hydrated lime (70 wt. % filter cake, 10 wt. % limestone and 20 wt. % hydrated lime).

FIG. 9 shows a graph of compressive strength vs time showing a comparison between (reference to the key down) (i) OPC, (ii) a mixture of OPC (70 wt. %) and GGBS (30 wt. %), (iii) a mixture of OPC (70 wt. %) and PFA (30 wt. %), (iv) a mixture of OPC (70 wt. %), filter cake as described above (15 wt. %) and blast furnace slag (Granulated) (15 wt. %), (v) a mixture of OPC (70 wt. %), filter cake as described above (15 wt. %) and blast furnace slag (Pelletised) (30 wt. %), and (vi) a mixture of OPC (70 wt. %), filter Cake as described above (15 wt. %) and blast furnace slag (Coarse) (15 wt. %). FIG. 10 shows a graph of Mortar Prism (standard industrial test) results of compressive strength vs time showing a comparison between (reference to the key down) (i) OPC, (ii) a mixture of OPC (70 wt. %) and GGBS (30 wt. %), (iii) a mixture of OPC (70 wt. %) and PFA (30 wt. %), (iv) a mixture of OPC (70 wt. %), filter cake as described above (15 wt. %) and blast furnace slag (Pelletised) (15 wt. %), (v) a mixture of OPC (70 wt. %) and 30 wt. % of a blend of filter cake as described above, limestone and hydrated lime (70 wt. % filter cake, 10 wt. % limestone and 20 wt. % hydrated lime).

An important aspect of the present invention is the effect it has on the environment. The end product has beneficial effects on people, plants, animals, water-ways, air pollution, soil climate, landscape, material assets and landfill requirements. The use of the waste filter cake material reduces reliance on the use of natural materials and makes full use of an industrial waste product, whilst obviating landfill sites. Additionally, dust emissions during quarrying are reduced. The inventors research has indicated that the waste filter cake material can be safely encased in concrete and meets or exceeds industry standards. It will be appreciated that encasing the waste filter cake material in a concrete material is far safer than depositing it in a landfill site. Additionally, the present invention provides a range of novel cementitious mixtures having chemical and physical properties which match or exceed currently available cements.

What is claimed is:

1. A process for making a hydraulic cementitious mixture, which process comprises the steps of:

(i) providing a first granular composition (A) comprising expressed in items of weight percent on an oxide basis:

|  | Weight % |
   | --- | --- |
   | $SiO_2$ | 55–80 |
   | $Al_2O_3$ | 10–20 |
   | $Na_2O$ | 1–10 |
   | $K_2O$ | 1–10 |
   | $Fe_2O_3$ | 0.5–2 |
   | SrO | 0–7 |
   | BaO | 0–7 |
   | $Ce_2O_3$ | 0–4 |
   | CaO | 0–2 |
   | $La_2O_3$ | 0–2 |
   | $Nd_2O_3$ | 0–1 |
   | $Pr_2O_3$ | 0–0.5 |
   | $P_2O_5$ | 0–0.5 |
   | $ZrO_5$ | 0–0.5 |
   | $Sb_2O_3$ | 0–0.5 |
   | $TiO_2$ | 0–0.5 |
   | MgO | 0–0.2 |
   | MnO | 0–0.1 | wherein the chloride content in composition (A) is from 0.013 to 0.05 weight % and the sulphate ion content is from 0.03 to 0.15 weight %, and (ii) providing a second granular commotion (B) comprising expressed in terms of weight precent on an oxide basis:

|  | Weight % |
   | --- | --- |
   | CaO | 80–99 |
   | $SiO_2$ | 1–10 |
   | $Fe_2O_3$ | 0.1–1.5 |
   | MgO | 0–8 |
   | $Al_2O_3$ | 0–3 |
   | BaO | 0–2 |
   | $K_2O$ | 0–0.4 |
   | $Na_2O$ | 0–0.2 |
   | SrO | 0–0.2 |
   | MnO | 0–0.2 |
   | $Ce_2O_3$ | 0–0.1 |
   | $La_2O_3$ | 0–0.1 |
   | $Pr_2O_3$ | 0–0.1 |
   | $P_2O_5$ | 0–0.1 |
   | $Nd_2O_3$ | 0–0.1 |
   | $TiO_2$ | 0–0.1 | wherein the chloride ion content in composition (B) is from 0.001 to 0.008 wt. % and the sulphate ion content is from 0.01 to 0.04 wt. %, and (iii) mixing granular compositions (A) and (B) to form a substantially homogeneous cementitious mixture at a weight ratio of composition (A) to composition (B) in the range of from 1:4 to 4:1.

2. A process as claimed in claim 1, wherein granular compositions (A) and (B) are mixed in relative proportions to form a substantially homogenous cementitious mixture having a total chloride ion content of 0.02 wt. % or less.

3. A process as claimed in claim 1, wherein granular compositions (A) and (B) are mixed in relative proportions to form a substantially homogenous cementitious mixture having a total $Na_2O$ content of 3 wt. % or less.

4. A process as claimed in claim 1, wherein granular compositions (A) and (B) are mixed in relative proportions to form a substantially homogenous cementitious mixture having a total $K_2O$ content of 4 wt. % or less.

5. A process as claimed claim 1, wherein composition (A) comprises expressed in terms of weight procent on an oxide basis:

|  | Weight % |
| --- | --- |
| $SiO_2$ | 60–75 |
| $Al_2O_3$ | 10–15 |
| $Na_2O$ | 1–5 |
| $K_2O$ | 1–6 |
| $Fe_2O_3$ | 0.8–1.5 |
| CaO | 0.1–1 |
| SrO | 1–4 |
| BaO | 1–5 |
| $Ce_2O_3$ | 0.2–2.5 | wherein the chloride ion content in composition (A) is from 0.02 to 0.03 wt. % and the sulphate ion content is from 0.05 to 0.09 wt. %.

6. A process as claimed in claim 1, wherein composition (B) comprises expressed in terms of weight procent on an oxide basis:

|  | Weight % |
| --- | --- |
| CaO | 83–96 |
| $SiO_2$ | 2–7 |
| $Fe_2O_3$ | 0.2–0.8 |
| $Al_2O_3$ | 0.5–1.5 |
| $Na_2O$ | 0.03–0.12 |
| $K_2O$ | 0.1–0.2 |
| MgO | 2–6 | wherein the chloride ion content composition (B) is from 0.002 to 0.006 wt. % and the sulphate ion content is from 0.015 to 0.03 wt. %.

7. A process as claimed in claim 1, wherein granular composition (A) and/or granular composition (B) has/have an average grain size of 75 $\mu$m or less.

8. A proccess as claimed in claim 1, wherein Composition (A) has a pH of from 9.5 to 10.5.

9. A process as claimed in claim 1, wherein composition (B) has a pH of from 9.0 to 10.0.

10. A process as claimed in claim 1, wherein the substantially homogenous cementitious mixture of compositions (A) and (B) has a pH of from 9.5 to 10.5.

11. A process as claimed in claim 1, wherein composition (A) comprises or consists of a filter-cake material.

12. A process as claimed in claim 11, wherein the filter-cake material is obtained by collecting the filterisation of waste from a glass-making process.

13. A process as claimed in claim 1, wherein composition (B) comprises limestone, Portland cement, lime and/or gypsum plaster.

14. A process as claimed in claim 13, wherein composition (B) comprises or consists of limestone obtained from dust extraction during quarrying.

15. A process as claimed in claim 1, further including the step of adding to the substantially homogenous cementitious mixture comprising compositions (A) and (B) granular hydrated lime.

16. A process as claimed in claim 1, further including the step of adding to the substantially homogenous cementitious mixture comprising compositions (A) and (B) granular kaolinite, granular china clay or a mixture thereof.

17. A process as claimed in claim 1, further including the step of adding to the substantially homogenous cementitious mixture comprising compositions (A) and (B) one or more of granular Portland cement, granular pulverised fuel ash, granular ground blast furnace slag, a pozzolanic material, paper sludge ash or a mixture of two or sore thereof.

18. A process as claimed in claim 1, further including the step of adding to the substantially homogenous cementitious mixture comprising compositions (A) and (B) a fine aggregate, a coarse aggregate or a mixture thereof.

19. A Process as claimed in claim 1, further including the step of adding to the substantially homogenous cementitious mixture comprising compositions (A) and (B) a colouring absent, an accelerator, a binder, microsilica, silica fume, a superplasticizer, a polymer, fibres or a mixture of two or more thereof.

20. A process as claimed in claim 1, further including the step of adding water to the substantially homogenous cementitious mixture comprising compositions (A) and (B).

21. A substantially homogeneous cementitious mixture obtainable by a process according to claim 1.

22. A concrete or mortar product comprising a substantially homogeneous cementitious mixture obtainable by a process according to claim 1.

23. A hydraulic cementitious mixture comprising a substantially homogenous blend of granular compositions (A) and (B) at a weight ratio or composition (A) to composition (B) in the range of from 1:4 to 4:1, wherein composition (A) comprises expressed it terms of weight precent on an oxide basis:

|  | Weight % |
|---|---|
| $SiO_2$ | 55–80 |
| $Al_2O_3$ | 10–20 |
| $Na_2O$ | 1–10 |
| $K_2O$ | 1–10 |
| $Fe_2O$ | 0.5–2 |
| SrO | 0–7 |
| BaO | 0–7 |
| $Ce_2O_3$ | 0–4 |
| CaO | 0–2 |
| $La_2O_3$ | 0–2 |
| $Nd_2O_3$ | 0–1 |
| $Pr_2O_3$ | 0–0.5 |
| $P_2O_5$ | 0–0.5 |
| $ZrO_2$ | 0–0.5 |
| $Sb_2O_3$ | 0–0.5 |
| $TiO_2$ | 0–0.5 |
| MgO | 0–0.2 |
| MnO | 0–0.1 | the chloride ion content in composition (A) being from 0.013 to 0.05 weight % and the sulphate ion content being from 0.03 to 0.15 weight %, and wherein composition (B) comprises expressed in terms of weight precent on an oxide basis:

|  | Weight % |
|---|---|
| CaO | 80–99 |
| $SiO_2$ | 1–10 |
| $Fe_2O_3$ | 0.1–1.5 |

-continued

|  | Weight % |
|---|---|
| MgO | 0–8 |
| $Al_2O_3$ | 0–3 |
| BaO | 0–2 |
| $K_2O$ | 0–0.4 |
| $Na_2O$ | 0–0.2 |
| SrO | 0–0.2 |
| MnO | 0–0.2 |
| $Ce_2O_3$ | 0–0.1 |
| $La_2O_3$ | 0–0.1 |
| $Pr_2O_3$ | 0–0.1 |
| $P_2O_5$ | 0–0.1 |
| $Nd_2O_3$ | 0–0.1 |
| $TiO_2$ | 0–0.1 | the chloride ion content in composition (B) being from 0.001 to 0.008 wt. % and the sulphate ion content being from 0.01 to 0.04 wt. %, and wherein the hydraulic cementitious mixture has an average grain size of 40 μm or less, preferably 20 μm or less, a pH of from 9.5 to 10.5 and a total chloride ion content of 0.02 wt. % or less.

24. A hydraulic cementitious mixture as claimed in claim 23, wherein composition (A) comprises of a filter-cake material.

25. A hydraulic cementitious mixture as claimed in claim 23, wherein composition (B) comprises limestone, Portland cement, lime and/or gypsum plaster.

26. A hydraulic cementitious mixture as claimed in claim 23 further comprising granular hydrated lime, granular Portland cement, granular pulverised fuel ash, granular ground blast furnace slag, a pozzolanic material, paper sludge ash or a mixture of two or more thereof.

27. A method of disposing of a waste filter cake material, which waste material has the following composition (A) expressed in terms of weight precent on an oxide basis:

|  | Weight % |
|---|---|
| $SiO_2$ | 55–80 |
| $Al_2O_3$ | 10–20 |
| $Na_2O$ | 1–10 |
| $K_2O$ | 1–10 |
| $Fe_2O_3$ | 0.5–2 |
| SrO | 0–7 |
| BaO | 0–7 |
| $Ce_2O_3$ | 0–4 |
| CaO | 0–2 |
| $La_2O_3$ | 0–2 |
| $Nd_2O_3$ | 0–1 |
| $Pr_2O_3$ | 0–0.5 |
| $P_2O_5$ | 0–0.5 |
| $ZrO_2$ | 0–0.5 |
| $Sb_2O_3$ | 0–0.5 |
| $TiO_2$ | 0–0.5 |
| MgO | 0–0.2 |
| MnO | 0–0.1 | wherein the ohloride ion content in composition (A) is from 0.013 to 0.05 weight % and the sulphate ion content is from 0.03 to 0.15 weight %, wherein the method comprises the steps of:

(i) providing composition (A) in granular form,
(ii) providing a second granular composition (C) comprising Portland cement and optionally one or both of ground granulated blast furnace slag and/or pulverised fuel ash, and
(iii) mixing granular compositions (A) and (C) in a proportion of 5 to 40 weight % of composition (A) to the Portland cement to form a substantially homogenous cementitious mixture having a total chloride ion content of 0.02 wt. % or less.

28. A substantially homogenous cementitious mixture obtainable by a method according to claim 27.

29. A concrete or mortar product comprising a substantially homogenous cementitious mixture according to claim 28.

30. A hydraulic cementitious mixture comprising a substantially homogeneous blend of from 60 to 95 wt. % Portland cement, from 5 to 40 wt. % of a granular composition (A) and optionally up to 35 wt. % of hydrated lime and/or ground blast furnace slag, which composition (A) comprises, expressed in terms of weight present on an oxide basis:

|  | Weight % |
| --- | --- |
| $SiO_2$ | 55–80 |
| $Al_2O_3$ | 10–20 |
| $Na_2O$ | 1–10 |
| $K_2O$ | 1–10 |
| $Fe_2O_3$ | 0.5–2 |
| SrO | 0–7 |
| BaO | 0–7 |
| $Ce_2O_3$ | 0–4 |
| CaO | 0–2 |
| $La_2O_3$ | 0–2 |
| $Nd_2O_3$ | 0–1 |
| $Pr_2O_3$ | 0–0.5 |
| $P_2O_5$ | 0–0.5 |
| $ZrO_2$ | 0–0.5 |
| $Sb_2O_3$ | 0–0.5 |
| $TiO_2$ | 0–0.5 |
| MgO | 0–0.2 |
| MnO | 0–0.1 | and has a chloride ion contest of from 0.013 to 0.05 weight % and the sulphate ion content of from 0.03 to 0.15 weight %.

31. A hydraulic cementitious mixture as claimed in claim 30, wherein composition (A) comprises expressed in terms of weight preset on an oxide basis:

|  | Weight % |
| --- | --- |
| $SiO_2$ | 60–75 |
| $Al_2O_3$ | 10–15 |
| $Na_2O$ | 1–5 |
| $K_2O$ | 1–6 |
| $Fe_2O_3$ | 0.8–1.5 |
| CaO | 0.1–1 |
| SrO | 1–4 |
| BaO | 1–5 |
| $Ce_2O_5$ | 0.2–2.5 | wherein the chloride ion content in composition (A) is from 0.02 to 0.03 wt. % and the sulphate ion content is from 0.05 to 0.09 wt. %.

32. A process as claimed in claim 1, wherein granular compositions (A) and (B) are mixed in relative proportions to form a substantially homogenous cementitious mixture having a total chloride ion content of 0.01 wt. % or less.

33. A process as claimed in claim 1, wherein granular compositions (A) and (B) are mixed in relative proportions to form a substantially homogenous cementitious mixture having a total $Na_2O$ content of 2 wt. % or less.

34. A process as claimed in claim 1, wherein granular compositions (A) and (B) are mixed in relative proportions to form a substantially homogenous cementitious mixture having a total $K_2O$ content of 3 wt. % or less.

35. A process as claimed in claim 1, wherein granular composition (A) and/or granular composition (B) has/have an average grain size of 40 µm or less.

36. A process as claimed in claim 1, wherein the substantially homogenous cementitious mixture of compositions (A) and (B) has a pH of from 9.8 to 10.2.

37. A hydraulic cementitious mixture as claimed in claim 23, wherein composition (A) comprises a filter-cake material obtained from a glass making process.

38. A hydraulic cementitious mixture as claimed in claim 23, wherein composition (B) comprises ground limestone, Portland cements lime and/or gypsum plaster.

39. A process as claimed in claim 1 wherein granular composition (A) and/or granular composition (B) has/have an average grain size of 20 µm or less.

* * * * *